US010155458B2

(12) United States Patent
Jarry et al.

(10) Patent No.: US 10,155,458 B2
(45) Date of Patent: Dec. 18, 2018

(54) HINGING ASSEMBLY FOR A VEHICLE SEAT

(71) Applicant: Faurecia Sièges d'Automobile, Nanterre (FR)

(72) Inventors: Benoît Jarry, Caen (FR); Nicolas Navatte, Conde sur Noireau (FR)

(73) Assignee: Faurecia Sièges D'Automobile, Nanterre (FR)

( * ) Notice: Subject to any disclaimer, the term of this patent is extended or adjusted under 35 U.S.C. 154(b) by 266 days.

(21) Appl. No.: 14/649,860

(22) PCT Filed: Dec. 2, 2013

(86) PCT No.: PCT/FR2013/052908
§ 371 (c)(1),
(2) Date: Jun. 4, 2015

(87) PCT Pub. No.: WO2014/087084
PCT Pub. Date: Jun. 12, 2014

(65) Prior Publication Data
US 2015/0306986 A1 Oct. 29, 2015

(30) Foreign Application Priority Data
Dec. 5, 2012 (FR) ..................... 12 61639

(51) Int. Cl.
*B60N 2/225* (2006.01)
*B60N 2/68* (2006.01)
*B60N 2/235* (2006.01)

(52) U.S. Cl.
CPC ......... *B60N 2/2252* (2013.01); *B60N 2/2356* (2013.01); *B60N 2/68* (2013.01); *B60N 2/682* (2013.01)

(58) Field of Classification Search
CPC ...... B60N 2/2252; B60N 2/2356; B60N 2/68; B60N 2/682
(Continued)

(56) References Cited

U.S. PATENT DOCUMENTS 6,010,191 A * 1/2000 Calinaud .............. B60N 2/2356
297/365
6,619,744 B2 * 9/2003 Reubeuze ............ B60N 2/2358
297/367 R
(Continued)

FOREIGN PATENT DOCUMENTS

DE 102007035138 A1 4/2008
DE 102007009172 A1 8/2008
(Continued)

OTHER PUBLICATIONS

International Search Report for PCT/FR2013/052908 dated Apr. 25, 2014, 3 pages.

*Primary Examiner* — Syed A Islam
(74) *Attorney, Agent, or Firm* — Reising Ethington P.C.

(57) ABSTRACT

The invention relates to a bracket (20) of a vehicle seat connecting a backrest (12) to a seat portion (11), including a hinge (10) which includes a first flange (3) and a second flange (4) connected to one another by means of inner peripheral teeth (31), thus defining an interface plane (P) perpendicular to the hinging axis and passing through said inner peripheral teeth, a first framework (5) of the backrest connected to the first flange (3) via a first attachment (1), a second framework (6) of the seat portion connected to the second flange (4) via a second attachment (2), the first attachment and the second attachment (1, 2) being arranged on the same side relative to the interface plane (P), the attachments preferably being welds.

10 Claims, 4 Drawing Sheets

(58) Field of Classification Search
USPC .................................. 297/362, 367 P, 367 L
See application file for complete search history.

(56) References Cited

U.S. PATENT DOCUMENTS

| | | | |
|---|---|---|---|
| 7,644,989 B2* | 1/2010 | Baloche Faurecia | B60N 2/225 297/362 |
| 8,152,241 B2* | 4/2012 | Krueger | B60N 2/2252 297/362 |
| 8,162,400 B2* | 4/2012 | Mitsuhashi | B60N 2/2356 297/362 |
| 8,201,887 B2* | 6/2012 | Zellmann | B60N 2/2356 297/362 |
| 8,240,768 B2* | 8/2012 | Kienke | B60N 2/2252 297/362 |
| 8,262,165 B2* | 9/2012 | Mitsuhashi | B60N 2/2252 297/362 |
| 8,628,144 B2* | 1/2014 | Moegling | B60R 22/22 297/313 |
| 8,998,328 B2* | 4/2015 | Stilleke | B60N 2/2252 297/362 |
| 2003/0080599 A1 | 5/2003 | Hohn | |
| 2006/0220430 A1 | 10/2006 | Baloche | |
| 2010/0060063 A1 | 3/2010 | Hille | |

FOREIGN PATENT DOCUMENTS

| | | |
|---|---|---|
| FR | 2883812 A1 | 10/2006 |
| FR | 2956623 A1 | 8/2011 |
| WO | 02064397 A1 | 8/2002 |

\* cited by examiner

HINGING ASSEMBLY FOR A VEHICLE SEAT

TECHNICAL FIELD

The present invention relates to reclining assemblies and particularly to seat bracket assemblies with recliners with stepwise adjustment or continuous adjustment that connect a backrest to a seat portion of said seat.

BACKGROUND

More specifically, the invention concerns a bracket assembly of a vehicle seat, connecting a backrest to a seat portion of said seat, that allows a pivoting movement about a hinging axis, the bracket assembly comprising:

at least one recliner allowing at least one adjustment of the angular position of the backrest relative to the seat portion, said recliner comprising a first flange and a second flange movably mounted to allow rotation relative to each other and connected to one another by at least one set of inner peripheral teeth, thereby defining an interface plane perpendicular to the hinging axis and passing through said inner peripheral teeth, a first framework forming part of the backrest structure, the first framework being connected to the first flange by a first attachment, a second framework forming part of the seat portion structure, the second framework being connected to the second flange by a second attachment.

A seat bracket assembly of this type is known from document FR2883812A. However, the first and second attachments respectively connecting the flanges and the frameworks are implemented on each side of the interface plane; the recliner offers satisfactory sturdiness in case of impact, but there is a need to further improve the sturdiness of such a recliner in case of impact and when extreme stresses are applied.

SUMMARY

To this end, according to the invention, a bracket assembly of the type in question is characterized in that the first attachment and the second attachment are arranged on the same side relative to said interface plane.

With these arrangements, the sturdiness of such a recliner in case of impact is improved and there is decreased risk of the two flanges moving apart from each other when extreme stresses are applied.

In various embodiments of the invention, one or more of the following arrangements may possibly be used:

the first attachment may be a weld; this provides a solid and compact attachment;

the second attachment may be a weld; this provides a solid and compact attachment;

the recliner may further comprise an adjustment arrangement connecting the first and second flanges, the adjustment arrangement being a stepwise adjustment arrangement; this allows the user to adjust the backrest to a comfortable position by means of a simple and sturdy recliner;

the adjustment arrangement may be a continuous adjustment arrangement, providing infinite comfortable positions; the mechanism in question may be motorized or manually driven;

the recliner may further comprise an enclosing ring for enclosing the recliner; this ring helps maintain the integrity of the recliner;

the first weld and/or second weld may be a laser beam weld; laser beam welding is a reliable welding process that allows welding within a confined space; one or the other of the laser beam welds may be made in the form of a weld bead placed substantially circumferentially about the axis in an arc of more than 180°; whereby the weld attachment is particularly robust;

one or the other of the laser beam welds may be made in the form of a plurality of juxtaposed spot welds and/or weld segments arranged substantially circumferentially about the axis; whereby the weld attachment is particularly robust.

The invention also relates to a vehicle seat comprising a seat portion, a backrest, and a bracket assembly as described above, wherein the recliner forms a first recliner and wherein the bracket assembly further comprises a second recliner similar to the first and symmetrical with the first relative to a vertical central plane of the seat.

BRIEF DESCRIPTION OF THE DRAWINGS

Other features, objects, and advantages of the invention will become apparent from the following description of two embodiments of the invention, given as non-limiting examples. The invention will also be better understood with reference to the accompanying drawings, where.

DESCRIPTION OF THE ILLUSTRATED EMBODIMENTS

In the various figures, the same references designate identical or similar elements.

Figure 1:
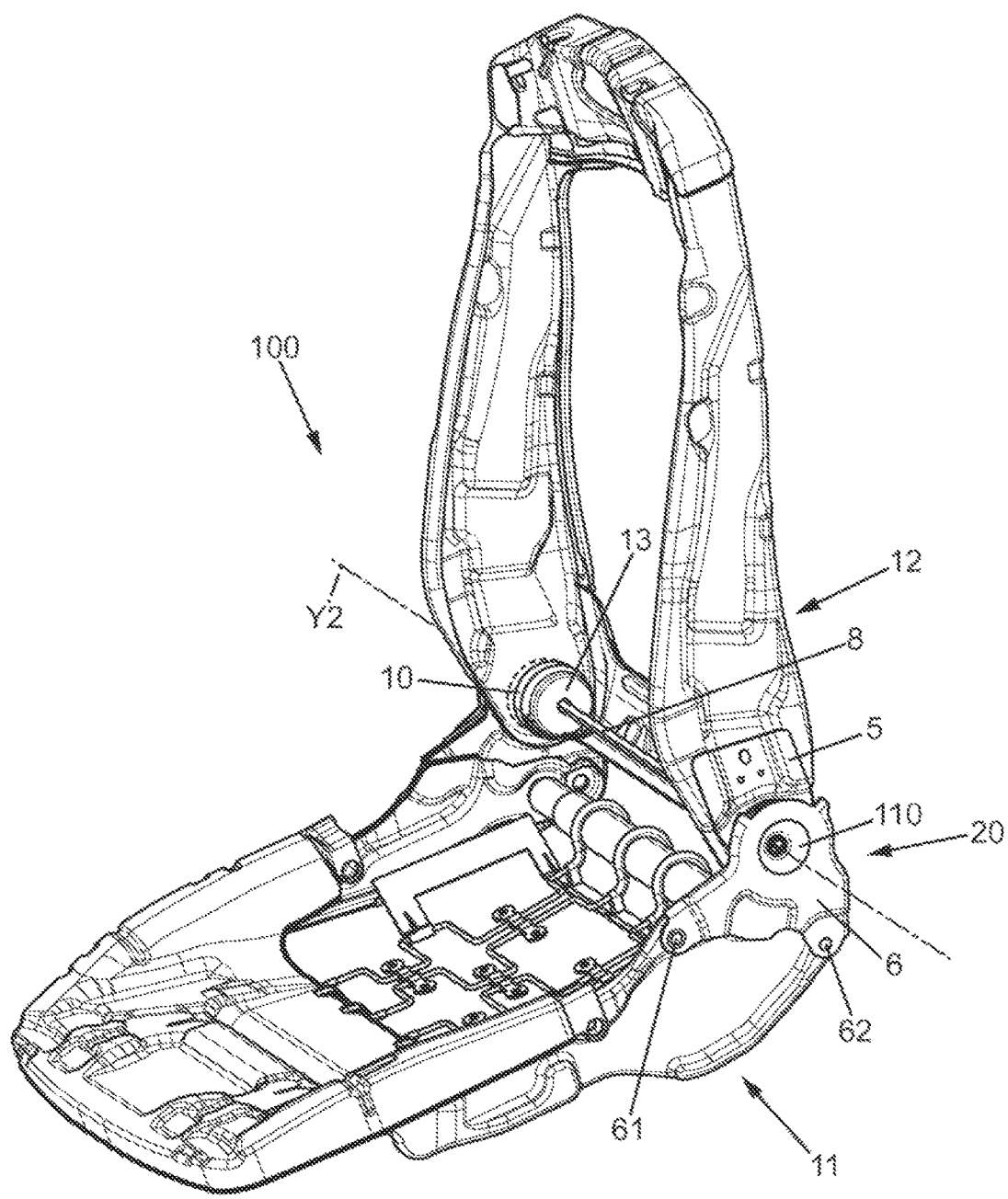
FIG. 1 is a perspective view of a seat structure incorporating a bracket assembly or reclining assembly according to a first embodiment of the invention.
Figure 2:
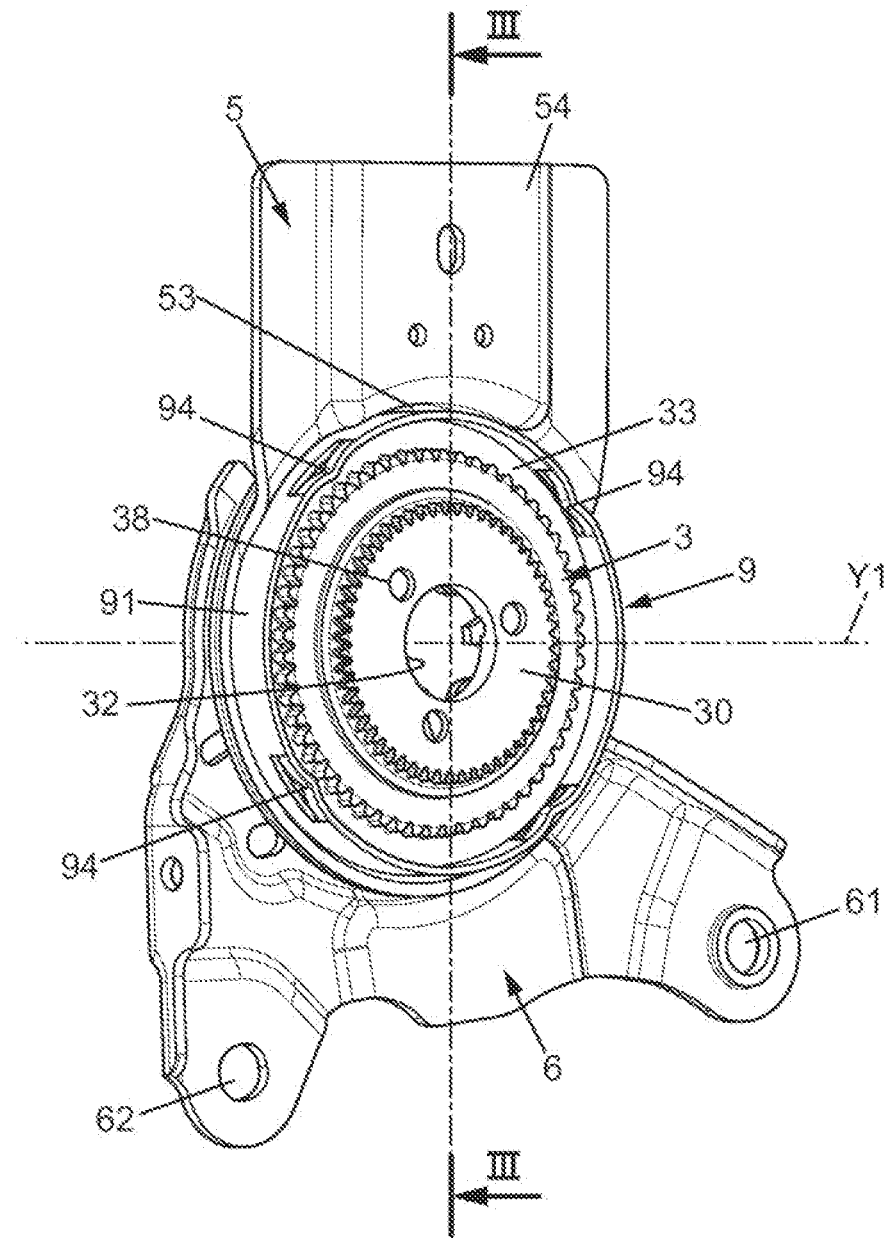
FIG. 2 is a perspective view of the bracket assembly visible in FIG. 1.

FIG. 1 shows a seat 100 of a motor vehicle, comprising a backrest 12 which is mounted on a seat portion 11 so as to be pivotable about a transverse horizontal pivot axis Y2, also called the reclining axis (or 'hinging axis'), the seat portion 11 being mounted on the floor of the vehicle, by means of rails where appropriate (not shown).

The structure (or frame) of the seat portion 11 is connected to the structure of the backrest 12 by means of a bracket assembly 20, also referred to herein as a "reclining assembly" 20, which may make use of various types of recliners.

A first known type concerns a 'discontinuous' recliner allowing stepwise adjustment, where the recliner can be placed in a plurality of lockable angular positions having a predetermined angular spacing between them, and the recliner can be unlocked by a user applying force on a control handle. The control returns elastically to a rest position corresponding to a locked state of the recliner, and is intended to be actuated manually by the user, directly or indirectly.

Another known type involves a so-called 'continuous' recliner where it is possible to obtain infinite different angular positions, the variation in position being obtained by rotation of a control shaft, this control shaft being operated either manually by a knob rotated by a user (not shown) or by an electromechanical actuator such as a gear motor (as shown in FIGS. 1 to 5).

The example shown in FIG. 1 represents a motorized continuous version where the user can actuate a control knob (not shown) to change the angular position of the backrest 12 relative to the seat portion 11 by means of a gear motor 13. The gear motor 13 in question can be of any suitable known type and will not be specifically described below.

In the example shown, the bracket assembly 20 comprises a first recliner 10, or first adjustment mechanism 10, located on one side of the seat frame 100, and a second recliner 110, or second adjustment mechanism 110, located on the other side of the seat frame 100, the first recliner 10 and second recliner 110 being connected by a control bar 8 placed transversely and which links the gear motor 13 output to each of said two recliners 10,110.

It should be noted that said recliners can also be called 'hinge apparatus'. In addition, it should be noted that the second recliner 110 is optional in the bracket assembly 20.

More particularly, the backrest 12 structure comprises on each side a first framework 5 which serves as a mechanical interface between the bracket assembly 20 for that respective side and the rest of the backrest 12 structure.

Similarly, the structure of the seat portion 11 comprises on each side a second framework 6 which serves as a mechanical interface between the bracket assembly 20 for that respective side and the rest of the seat portion 11 structure. The second framework 6 comprises holes 61,62 for securing it to the rest of the seat portion structure.

As illustrated in FIGS. 1 to 5, each of said adjustment mechanisms 10,110 comprises a first flange 3 and a second flange 4 that are generally disc-shaped and mounted so as to be pivotable relative to each other.

In the current case, the first flange 3 is formed as a metal part that is stamped, pressed, cut, or sintered, centered on a rotation axis Y1, comprising a central portion 30 pierced with an axial opening 32 and three holes 38, and a peripheral portion 33 axially offset relative to the central portion; said peripheral portion 33 comprises inner peripheral teeth 31 arranged circularly and facing towards the transverse horizontal pivot axis Y2.

In addition, the second flange 4 is also formed as a metal part that is stamped, pressed, cut, or sintered, having a cylindrical tubular portion 40 centered on the transverse horizontal pivot axis Y2, and a transverse portion 42 arranged in a plane perpendicular to the transverse horizontal pivot axis Y2; the end of the transverse portion 42 comprises peripheral teeth 41 that face outwards.

The peripheral teeth 41 of the second flange 4 comprise at least one tooth fewer than the inner peripheral teeth 31 of the first flange 3, and furthermore the inner peripheral teeth 31 and the peripheral teeth 41 are mutually engaged for at least an angular portion so as to form an adjustment arrangement 7 that allows adjusting the relative position of the first and second flanges 3,4.

An eccentric cam 14 having a central opening 18 is designed to be rotated by the control bar 8. Each time the eccentric cam 14 completes one revolution, the first and second flanges 3,4 are shifted angularly relative to one another by an angle corresponding to the difference between the number of teeth in the inner peripheral teeth 31 and in the peripheral teeth 41.

A brake 15 prevents any unwanted rotation of the eccentric cam 14, in particular if significant vibration or torque is exerted on one of the flanges 3,4 relative to the other.

'Continuous' adjustment mechanisms of the type used in the present invention are described in detail for example in patent FR2883812.

Figure 3:
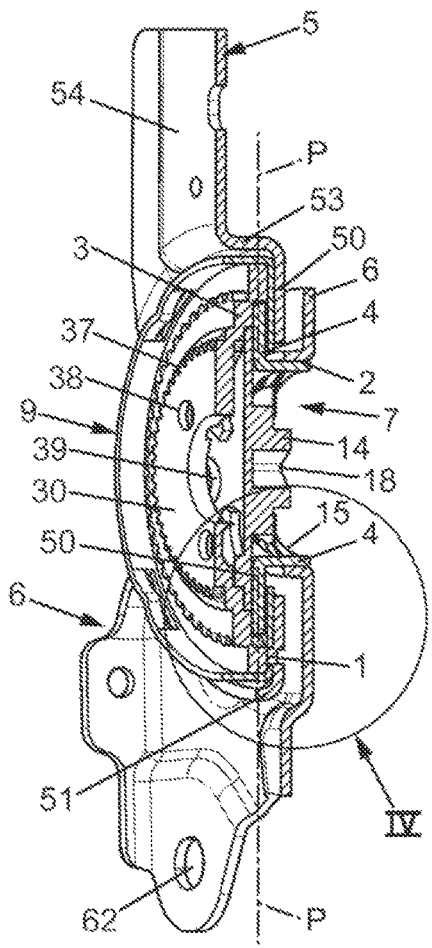
FIG. 3 is a perspective view of a vertical section along direction III-III of the bracket assembly of FIG. 2.
Figure 4:
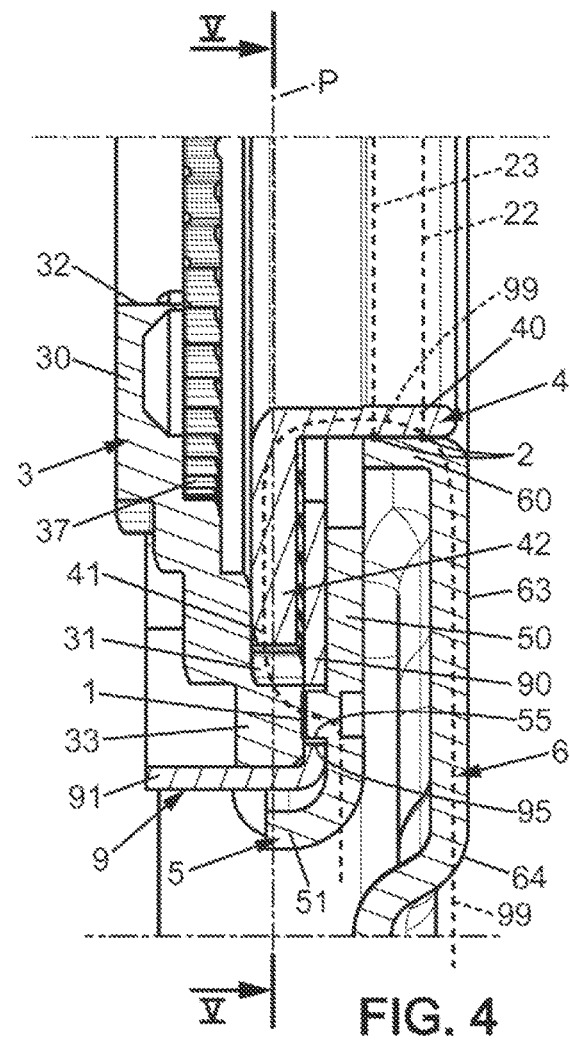
FIG. 4 is a partial vertical sectional view along direction III-III of the bracket assembly of FIG. 2.

As illustrated in FIGS. 3 and 4, an interface plane P is defined that is perpendicular to the transverse horizontal pivot axis Y2 and that passes through said inner peripheral teeth 31.

The first framework 5 is made of metal and comprises a connecting plate 54 for connection to the backrest 12, an axially offset extending area 53, and an annular portion 50 centered on the axis of rotation Y1 and having a circular edge 51.

The second framework 6 comprises a connecting plate 64 for connection to the seat portion 11 and an annular region 63 centered on the transverse horizontal pivot axis Y2 and having an axial cylindrical collar 60.

In addition, the bracket assembly 20 may comprise an enclosing ring 9 formed of sheet metal. This enclosing ring 9 comprises a radial section 90 arranged in a plane perpendicular to the transverse horizontal pivot axis Y2, and a cylindrical axial section 91.

The radial section 90 is arranged between the transverse portion 42 of the second flange 4 and the annular portion 50 of the first framework 5.

In addition, this enclosing ring 9 comprises stamped (punched) indentations 94 which then cover the peripheral portion 33 of the first flange 4, retaining the first and second flanges 3,4 against one another axially, by means of an actuator housing ring gear (not shown in FIGS. 3 and 4).

In addition, this enclosing ring 9 comprises recesses 95 forming an arc centered on the transverse horizontal pivot axis Y2, whose usefulness will become apparent further below.

Alternatively, in a manual control version (continuous or discontinuous), the enclosing ring 9 may be enclosed by crimping against the peripheral portion 33 of the first flange 3, similarly to what is described in patent FR2883812 (FIGS. 3 and 7 with the associated comments).

Advantageously according to the invention, a first attachment 1 is implemented in order to secure the first flange 3 to the first framework 5, at projections 55.

This first attachment 1 may be a riveting, crimping, bolting, or some other similar solution. In particular, the first attachment 1 may advantageously be a weld 1.

Similarly, a second attachment 2 is implemented in order to secure the second flange 4 to the second framework 6.

In a similar manner, the second attachment 2 may be a riveting, crimping, bolting, or some other similar solution. In particular, the second attachment 2 may advantageously be a weld 2.

Advantageously according to the invention, the first attachment 1 and second attachment 2 are placed on the same side relative to the interface plane P, which creates a short path for the transmission of applied forces from one framework to the other (dotted line 99).

In a preferred aspect, one and/or the other of the welds 1,2 are welds made on the surface or through transparent materials, in particular laser beam welds.

Figure 5:
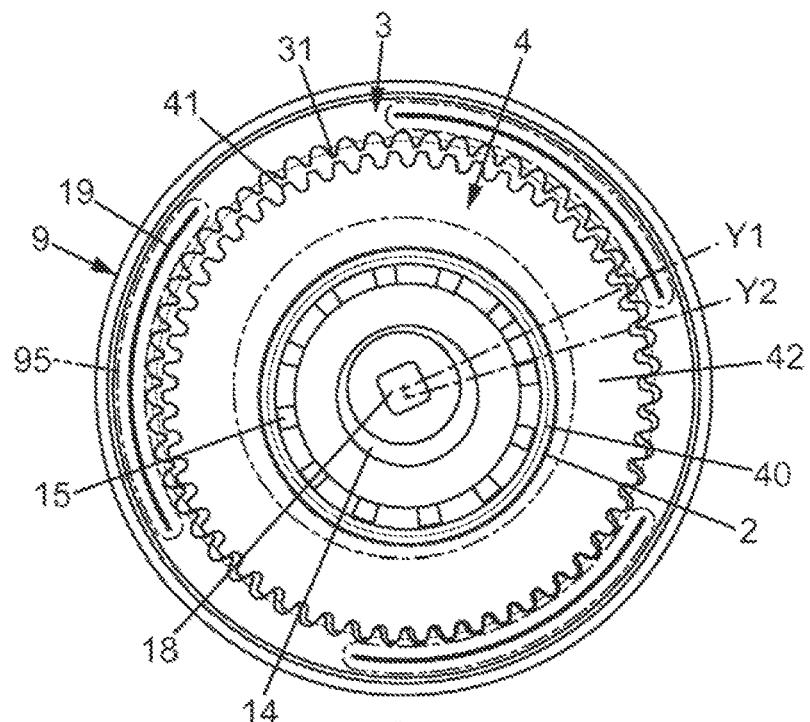
FIG. 5 is a transverse sectional view along direction V-V of the recliner of FIG. 2.

More particularly, one or the other of the welds 1,2 may be made in the form of a weld bead 19 arranged substantially circumferentially about the axis, in an arc of more than 180° (see FIG. 5).

It is also possible to create one or the other of the welds 1,2 in the form of a plurality of juxtaposed spot welds or weld segments. In the example illustrated in FIG. 4, two juxtaposed weld segments 22,23 are arranged substantially circumferentially about the transverse horizontal pivot axis Y2.

Of course, the shape and length of the weld segments can be adapted to application requirements. Similarly, there is no requirement to use the same solution for both welds: the shape and configuration of the first weld 1 can be different from the shape and configuration of the second weld 2.

In a manually operated configuration, the control bar 8 is actuated by a handle externally located on one side of the seat frame 100, the control bar directly driving the eccentric cam 14 of each of said recliners 10,110.

In a motorized configuration, the control bar 8 is rotated by means of the gear motor 13, with the possibility of a planetary gearbox being placed between them as shown in the example. In this case, the eccentric cam 14 is a planet carrier having planets (not shown) pivotally mounted on pins 39, said planets being engaged with ring gear teeth 37 of the first flange 3, the sun gear of the planetary gear being formed by the output shaft of the rotor of the gear motor 13.

Figure 6:
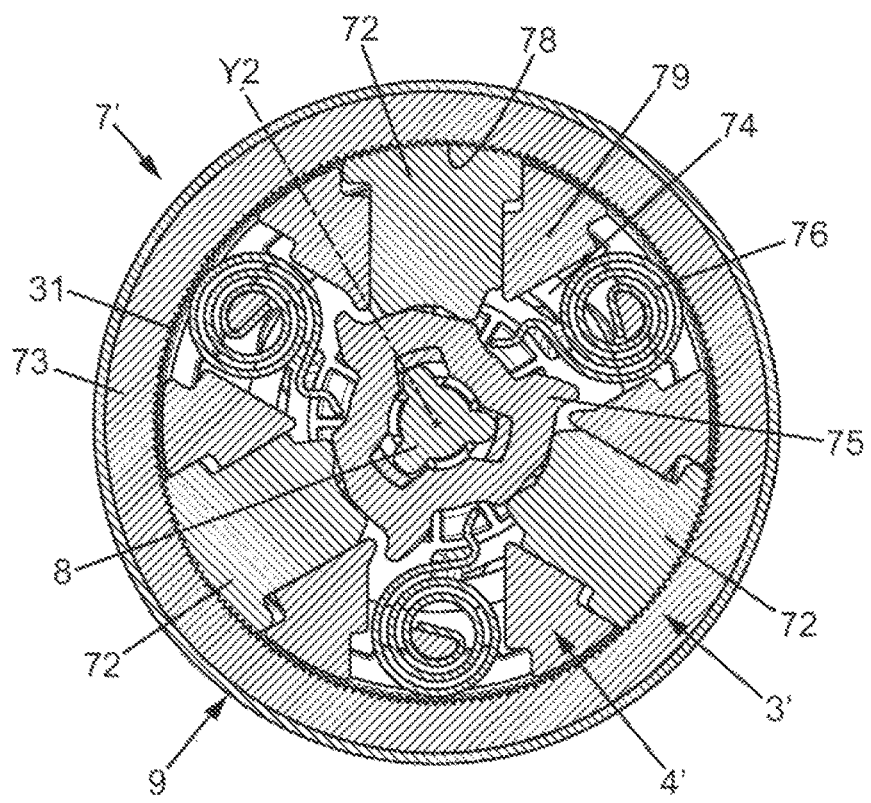
FIG. 6 is a transverse sectional view of another embodiment of the invention, concerning a recliner with stepwise adjustment.

FIG. 6 shows a cross-sectional view of another embodiment of the invention, in a configuration with a discontinuous (stepwise) recliner. Only the adjustment arrangement 7' is represented, because all the external elements are considered to be identical or similar.

In this configuration, each of the recliners comprises locking tabs 72 for immobilizing the rotation of one flange 3' relative to the other flange 4', as is known per se.

The first flange 3' comprises a peripheral portion 73 having inner peripheral gear teeth 31 cooperating with the teeth 78 of each locking tab 72.

The second flange 4' comprises guides 79 for guiding the locking tabs 72 in radial translation.

Each of said recliners 10,110 also comprises a locking cam 75 acting on the locking tabs 12 in an outward radial direction, and one or more return springs 76 to return the locking cam 75 to a locked position. In this position, the locking tabs 72 prevent rotation of one flange relative to the other by the engagement of the teeth 31 and 78, thus locking the recliner. A control plate 74 allows the tabs 72 to move inwards when the control bar 8 is rotated in response to user actuation, thereby unlocking the recliner.

The 'discontinuous' or stepwise type of adjustment mechanisms (recliners) used in the present invention are described in detail for example in patent FR2956623.

It is understood that the invention can be applied to any type of adjustment mechanism 7, whether continuous or discontinuous.

The invention claimed is:

1. A bracket assembly of a vehicle seat, connecting a backrest to a seat portion of said seat, that allows a pivoting movement about a hinging axis, the bracket assembly comprising:
   at least a first recliner allowing at least one adjustment of the angular position of the backrest relative to the seat portion of the seat, said first recliner comprising a first flange and a second flange movably mounted to allow rotation relative to each other and connected to one another by at least one set of inner peripheral teeth arranged at the first flange engaged at rest by counterpart teeth arranged at the second flange to secure a given angular position between the backrest and the seat portion, thereby defining an interface plane perpendicular to the hinging axis and passing through said inner peripheral teeth,
   a first framework forming part of the backrest structure, the first framework being connected to the first flange by a first attachment,
   a second framework forming part of the seat portion structure, the second framework being connected to the second flange by a second attachment,
   wherein the first attachment and second attachment are arranged on the same side relative to the interface plane.

2. The bracket assembly according to claim 1, wherein the first attachment is a weld.

3. The bracket assembly according to claim 1, wherein the second attachment is a weld.

4. The bracket assembly according to claim 1, comprising an adjustment arrangement connecting the first and second flanges, said adjustment arrangement being a continuously adjustable arrangement.

5. The bracket assembly according to claim 1, comprising an adjustment arrangement connecting the first and second flanges, said adjustment arrangement being a stepwise adjustment arrangement.

6. The bracket assembly according to claim 1, further comprising an enclosing ring for enclosing the recliner.

7. The bracket assembly according to claim 1, wherein the first attachment and/or the second attachment is a laser beam weld.

8. The bracket assembly according to claim 7, wherein one or the other of the laser beam welds is in the form of a weld bead placed substantially circumferentially about the axis, in an arc of more than 180°.

9. The bracket assembly according to claim 7, wherein one or the other of the laser beam welds is in the form of a plurality of juxtaposed spot welds and/or weld segments arranged substantially circumferentially about the axis.

10. A vehicle seat comprising a seat portion, a backrest, and a bracket assembly according to claim 1, wherein the bracket assembly further comprises, additionally to the first recliner, a second recliner symmetrical with the first recliner relative to a vertical central plane of the seat.

* * * * *